United States Patent
Darling et al.

(10) Patent No.: US 9,225,458 B2
(45) Date of Patent: Dec. 29, 2015

(54) WAVELENGTH-SELECTIVE CROSS-CONNECT DEVICE HAVING A VARIABLE NUMBER OF COMMON PORTS

(71) Applicant: Alcatel-Lucent USA Inc., Murray Hill, NJ (US)

(72) Inventors: Mike J. Darling, San Jose, CA (US); Lu Cheng, Santa Clara, CA (US); Jeffrey E. Ehrlich, San Jose, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 54 days.

(21) Appl. No.: 14/135,632

(22) Filed: Dec. 20, 2013

(65) Prior Publication Data

US 2015/0180603 A1    Jun. 25, 2015

(51) Int. Cl.
*H04J 14/02* (2006.01)
*H04Q 11/00* (2006.01)
*H04B 10/27* (2013.01)

(52) U.S. Cl.
CPC ............ *H04J 14/0212* (2013.01); *H04B 10/27* (2013.01); *H04Q 11/0005* (2013.01); *H04Q 2011/003* (2013.01); *H04Q 2011/0016* (2013.01); *H04Q 2011/0022* (2013.01); *H04Q 2011/0035* (2013.01)

(58) Field of Classification Search
CPC ............ H04Q 11/0005; H04Q 2011/0016; H04Q 2011/0022; H04Q 2011/0026; H04Q 2011/003; H04Q 2011/0035; H04J 14/0212; H04B 10/27
USPC ................. 398/45, 48–50, 55, 56, 82, 87, 88
See application file for complete search history.

(56) References Cited

U.S. PATENT DOCUMENTS

| | | | |
|---|---|---|---|
| 6,300,619 B1 | 10/2001 | Aksyuk et al. | |
| 6,859,300 B2 | 2/2005 | Greywall | |
| 7,126,250 B2 | 10/2006 | Greywall et al. | |
| 8,131,123 B2 * | 3/2012 | Presley et al. | 385/18 |
| 8,958,693 B2 * | 2/2015 | Matsumoto | 398/48 |
| 2005/0213877 A1 * | 9/2005 | Wu et al. | 385/18 |
| 2010/0202778 A1 * | 8/2010 | Wisseman | 398/83 |
| 2012/0027408 A1 * | 2/2012 | Atlas et al. | 398/58 |
| 2012/0219293 A1 * | 8/2012 | Boertjes et al. | 398/48 |
| 2012/0237218 A1 * | 9/2012 | Yang et al. | 398/48 |

* cited by examiner

*Primary Examiner* — Dalzid Singh
(74) *Attorney, Agent, or Firm* — Mendelsohn, Drucker & Dunleavy, P.C.; Yuri Gruzdkov

(57) ABSTRACT

A configurable wavelength-selective cross-connect (WSXC) device having an array of optical ports in which at least some of the ports are configurable to operate as common ports or as plural ports. The configurable WSXC device includes a MEMS mirror array whose mirrors are tiltable in a manner that enables, e.g., reconfigurations of the configurable WSXC device that result in a change of the number of common ports therein. In one possible configuration, the configurable WSXC device can operate as $1 \times M_1$ wavelength-selective switch, where $M_1 + 1 \leq P$, and P is the total number of optical ports in the array of optical ports. In another possible configuration, the configurable WSXC device can operate as a bank of n $1 \times M_2$ wavelength-selective switches, where n is a positive integer greater than one, and $n(M_2+1) \leq P$.

25 Claims, 10 Drawing Sheets

100

400

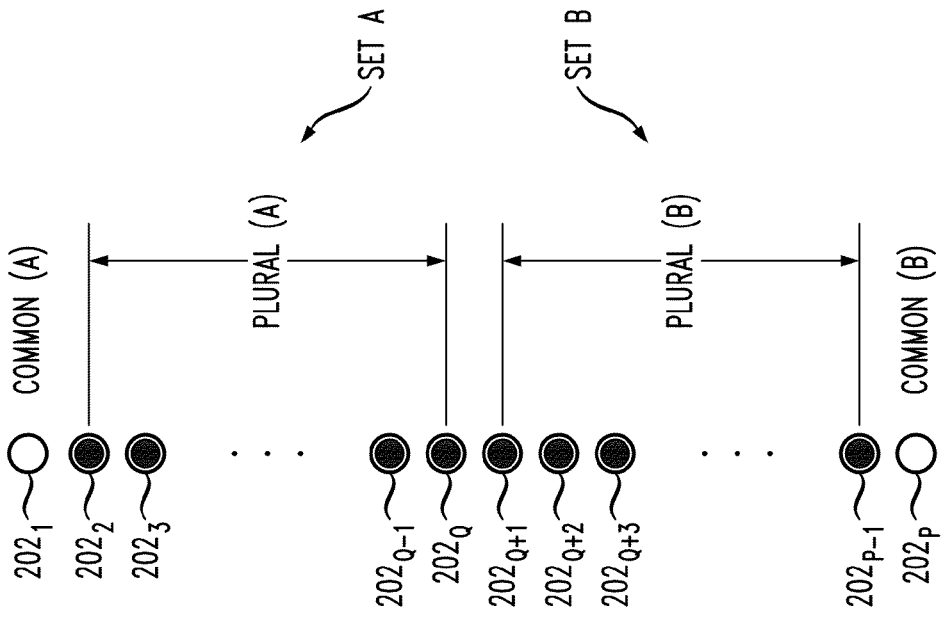
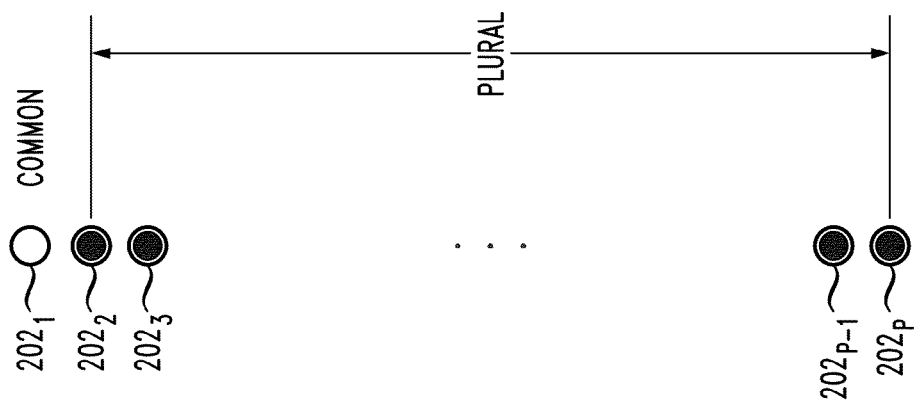

WAVELENGTH-SELECTIVE CROSS-CONNECT DEVICE HAVING A VARIABLE NUMBER OF COMMON PORTS

BACKGROUND

1. Field

The present disclosure relates to optical communication equipment and, more specifically but not exclusively, to optical cross-connect switches and reconfigurable optical add/drop multiplexers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Wavelength-selective cross-connect (WSXC) switches and reconfigurable optical add/drop multiplexers (ROADMs) are important network elements in optical wavelength-division-multiplexing (WDM) networks because they can support dynamic provisioning and automated restoration in the network and can be implemented to be transparent to the signal bit rate, modulation format, and transmission protocol. Substantially the same physical-device architecture can be used to implement a WSXC switch and a ROADM, with the classification of the resulting physical device as the former or the latter depending mostly on the degree of switching enabled by the device. An optical-WDM network architecture employing WSXC devices has many attractive features that help to accelerate service deployment, accelerate rerouting around points of failure in the network, reduce capital and operating expenses for the service provider, and provide a network topology that is amenable to future network upgrades.

SUMMARY OF SOME SPECIFIC EMBODIMENTS

Disclosed herein are various embodiments of a configurable wavelength-selective cross-connect (WSXC) device having an array of optical ports in which at least some of the ports are configurable to operate as common ports or as plural ports. The configurable WSXC device includes a MEMS mirror array whose mirrors are tiltable in a manner that enables, e.g., reconfigurations of the configurable WSXC device that result in a change of the number of common ports therein. For example, in one configuration, the configurable WSXC device can operate as $1 \times M_1$ wavelength-selective switch, where $M_1+1 \leq P$, and P is the total number of optical ports in the array of optical ports. In an alternative configuration, the same configurable WSXC device can operate as a bank of n $1 \times M_2$ wavelength-selective switches, where n is a positive integer greater than one, and $n(M_2+1) \leq P$.

According to one embodiment, provided is an apparatus comprising: a reconfigurable wavelength-selective optical router; and a MEMS mirror array having a plurality of individually movable mirrors, wherein each of the movable mirrors is configured to receive light from or direct light to a respective one optical port in an array of optical ports and is configurable to optically couple the optical ports in at least a first configuration and a second configuration. In the first configuration, the array of optical ports has a single common port and a plurality of plural ports that are configured as a common port and plural ports, respectively, of a first wavelength-selective switch. In the second configuration, the array of optical ports has a first common port, a second common port, a first plurality of plural ports, and a second plurality of plural ports. The first common port and the first plurality of plural ports are configured as a common port and plural ports, respectively, of a second wavelength-selective switch. The second common port and the second plurality of plural ports are configured as a common port and plural ports, respectively, of a third wavelength-selective switch.

According to another embodiment, provided is a method of configuring a WSXC device comprising the steps of: sorting P optical ports of the WSXC device into n non-overlapping sets of ports, where P is a positive integer greater than five and n is a positive integer greater than one; in each of said n non-overlapping sets of ports, designating one common port and a respective plurality of plural ports; and individually tilting tiltable mirrors in a MEMS mirror array of the WSXC device to cause a spectrally dispersive element of the WSXC device to disperse light across a beam-steering device of the WSXC device at n different positions that are offset from one another in a direction orthogonal to a dispersion direction such that each position is configured to receive light from a respective one of the n non-overlapping sets of ports.

According to yet another embodiment, provided is an apparatus comprising an optical routing device that comprises an array of MEMS mirrors and a wavelength-selective optical router being optically connected to an array of P optical ports by the array of MEMS mirrors. The MEMS mirrors are configurable to connect the optical ports of the array of the P optical ports to the wavelength-selective optical router in different first and second configurations, the optical routing device being configured to operate some of the optical ports of the array of the P optical ports as a $1 \times N_1$ first optical wavelength-selective switch in the first configuration with $N_1$ being smaller than P and greater than one, and being configured to operate some of the optical ports of the array of the P optical ports as a $1 \times N_2$ second optical wavelength-selective switch and a $1 \times N_3$ third optical wavelength-selective switch in the second configuration with the integers $N_2$ and $N_3$ each being greater than one and where $N_2+N_3+2 \leq P$.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 5A-5B show optical port assignments in two example configurations of the configurable WSXC device shown in FIG. 2 according to an embodiment of the disclosure;

DETAILED DESCRIPTION OF SOME SPECIFIC EMBODIMENTS

Figure 1:
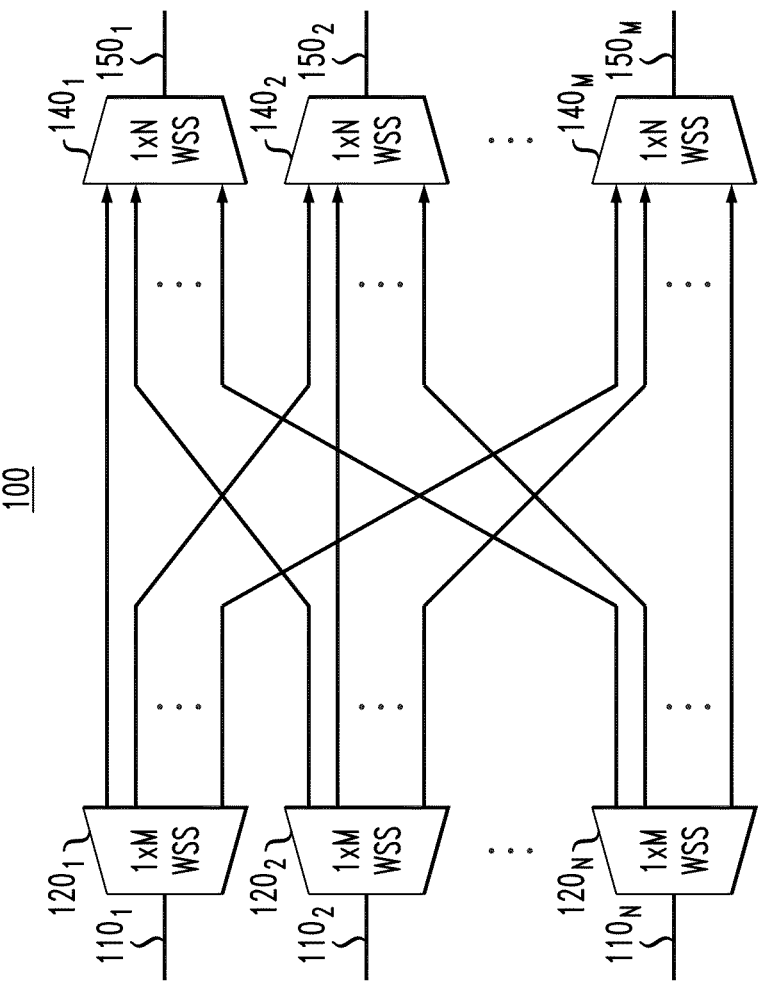
FIG. 1 shows a block diagram of a wavelength-selective cross-connect (WSXC) device according to an embodiment of the disclosure.

FIG. 1 shows a block diagram of a wavelength-selective cross-connect (WSXC) device 100 according to an embodiment of the disclosure. Device 100 has N input ports $110_1$-$110_N$ and M output ports $150_1$-$150_M$, where N and M are (either the same or different) integers greater than one. After device 100 is deployed, each of input ports 110 and output ports 150 may have a respective optical fiber (not explicitly shown in FIG. 1) connected to it. In operation, each of these optical fibers is configured to transport a respective optical WDM signal. In principle, each of the transported WDM signals can have an arbitrary number of WDM components (modulated carrier wavelengths), with the total number K of unique carrier wavelengths that are being handled by device 100 being independent of N and/or M.

Device 100 comprises N (1×M) wavelength-selective switches (WSSs) $120_1$-$120_N$ and M (1×N) wavelength-selective switches (WSSs) $140_1$-$140_M$, interconnected as shown in FIG. 1. A wavelength-selective switch is a (re)configurable optical multiplexer/de-multiplexer that can be configured to route the full set or any selected subset of the K carrier wavelengths between its common port and any selected one of its plural ports. As used herein, the term "common port" refers to a port having the following features. When an input port, a common port can be configured to variously distribute the received carrier wavelengths among the plural ports such that different plural ports internally receive and externally output different non-overlapping subsets of the K carrier wavelengths. One of these possible configurations can be such that all wavelengths externally applied to the common port go to a single plural port while other plural ports receive no carrier wavelengths from the common port. When an output port, a common port can internally collect and externally output up to K carrier wavelengths from the different plural ports such that different plural ports contribute different non-overlapping subsets of the K wavelengths. Again, one of these possible configurations can be such that all carrier wavelengths collected by the common port originate from a single plural port while other plural ports contribute no carrier wavelengths to the common port. It is customary to depict a WSS using a block diagram in which (i) the common port is shown at the side having a single port (see FIG. 1) and (ii) a plural port is any of the ports located at the side having multiple ports (also see FIG. 1). For example, in device 100, each wavelength-selective switch $120_i$ has its common port optically coupled to the corresponding input port $110_i$. Similarly, each wavelength-selective switch $140_i$ has its common port optically coupled to the corresponding output port $150_i$. The plural ports of wavelength-selective switches $120_1$-$120_N$ are optically coupled to the plural ports of wavelength-selective switches $140_1$-$140_M$ as indicated in FIG. 1. The latter connection can be implemented through free space, e.g., with mirrors and lenses, or through optical waveguides.

Each wavelength-selective switch 120 is configured to operate as a configurable de-multiplexer that routes optical signals from the common port to the various plural ports. Each wavelength-selective switch 140 is configured to operate as a configurable multiplexer that routes optical signals from the various plural ports to the common port. Using the routing characteristics of wavelength-selective switches 120 and 140, device 100 is capable of directing any carrier wavelength or any set of two or more carrier wavelengths from any input port 110 to any output port 150. In operation, device 100 may employ a switch controller (not explicitly shown in FIG. 1) that is operatively connected to control the routing configurations of wavelength-selective switches $120_1$-$120_N$ and $140_1$-$140_M$. The controller may use appropriate routing algorithms, e.g., to avoid signal collisions at any of output ports $150_1$-$150_M$, with a collision being an event in which two different optical signals having the same carrier wavelength arrive simultaneously at the same output port 150.

One potential problem with device 100 is that its different embodiments corresponding to different values of N and/or M may have to be realized using variously sized wavelength-selective switches 120 and 140. This may disadvantageously force the device manufacturer to develop, manufacture, and/or maintain a relatively large inventory of assorted physical devices from which to choose the wavelength-selective switches for fabricating a concrete copy of device 100 of the ordered size. Advantageously, some embodiments of configurable WSXC devices disclosed herein may enable the device manufacturer to reduce the size of its inventory by providing a configurable WSXC device that can operate, in its various configurations, e.g., as a single wavelength-selective switch or as a switch bank comprising two or more wavelength-selective switches of a smaller size. Different configurations of the configurable WSXC device use the same hardware and may differ only in how that same hardware is programmed to operate.

For example, a configurable WSXC device of the disclosure having a total of twelve ports can be configured to operate in any of the following configurations:
  (i) as a 1×9 wavelength-selective switch having one common port and nine plural ports;
  (ii) as a bank of two 1×4 wavelength-selective switches, each having one common port and four plural ports, for a total of two common ports; and
  (iii) as a bank of four 1×2 wavelength-selective switches, each having one common port and two plural ports, for a total of four common ports.

This example configurable WSXC device may enable a reduction of the manufacturer's inventory, e.g., because the same physical device can be used as any of:
  (A) a wavelength-selective switch $120_i$, e.g., when M=9;
  (B) a pair of wavelength-selective switches $120_i$-$120_{i+1}$, e.g., when M=4; and
  (C) a quartet of wavelength-selective switches $120_i$-$120_{i+3}$, e.g., when M=2.

One of ordinary skill in the art will understand that other configurations/uses may also be possible, as long as the total port count used in the configuration does not exceed the total physical port count in the configurable WSXC device. One of ordinary skill in the art will further understand that a configurable WSXC device of the disclosure may similarly be used as a single wavelength-selective switch $140_i$, or as a switch bank comprising two or more wavelength-selective switches 140.

Figure 2:
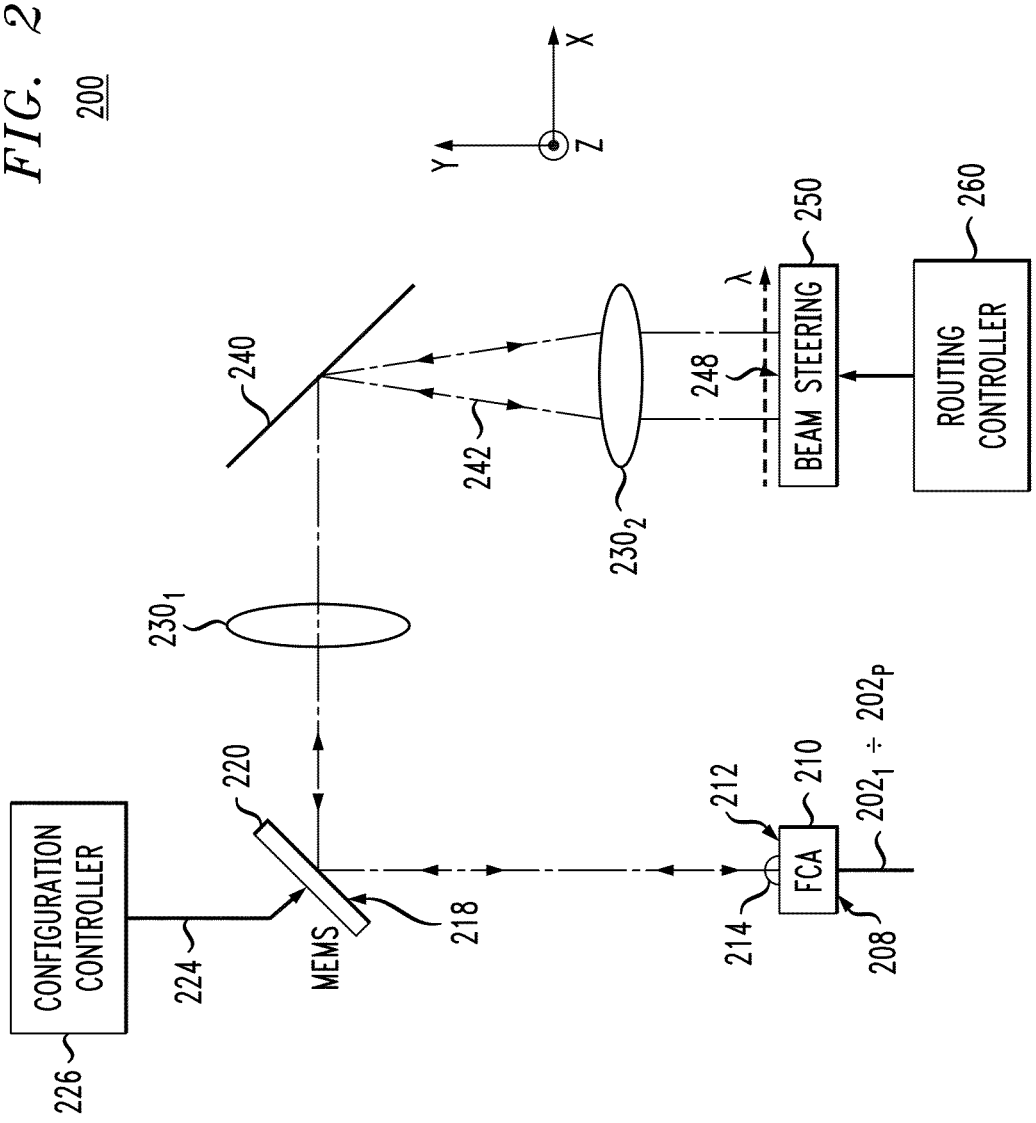
FIG. 2 shows a block diagram of a configurable WSXC device that can be used as part of the WSXC device shown in FIG. 1 according to an embodiment of the disclosure.

FIG. 2 shows a block diagram of a configurable WSXC device 200 according to an embodiment of the disclosure. Device 200 has a total of P optical ports $202_1$-$202_P$, where P is an integer greater than two. At least some if not all of ports $202_1$-$202_P$ are reconfigurable such that an optical port in question can operate either as a common port or as a plural port. When device 200 is configured to operate with a single common port, device 200 can be used, e.g., as (i) a wavelength-selective switch 120 (FIG. 1) for which M≤P−1 or (ii) a wavelength-selective switch 140 (FIG. 1) for which N≤P−1.

When device 200 is configured to operate with two common ports, device 200 can be used, e.g., as (i) a pair of wavelength-selective switches 120 (FIG. 1) for which 2M≤P−2 or (ii) a pair of wavelength-selective switches 140 (FIG. 1) for which 2N≤P−2. When device 200 is configured to operate with three common ports, device 200 can be used, e.g., as (i) a triplet of wavelength-selective switches 120 (FIG. 1) for which 3M≤P−3 or (ii) a triplet of wavelength-selective switches 140 (FIG. 1) for which 3N≤P−3, etc.

In an example embodiment, ports $202_1$-$202_P$ are arranged in a linear array lined up parallel to the Z-coordinate axis. As a result, ports $202_1$-$202_P$ appear stacked on top of one another in the projection shown in FIG. 2. In one embodiment, each of ports $202_1$-$202_P$ may include a fiber connector for connecting a corresponding optical fiber configured to receive a respective optical WDM signal either from an external link of from the interior of device 200.

Ports $202_1$-$202_P$ are located at a backside 208 of a fiber collimator array (FCA) 210. A front side 212 of FCA 210 has a plurality of collimating lenses 214 arranged in a linear array and generally containing one lens 214 per one port 202. In an example embodiment, lenses 214 are positioned with respect to the optical fibers connected to ports $202_1$-$202_P$ such that (i) the tip of each optical fiber is located approximately at the focal point of the corresponding lens 214 and (ii) the optical axis of the lens is aligned with the optical axis of the fiber in the vicinity of the tip. As used herein, the term "tip" is to be understood to relate to an end or extremity of the optical fiber. One of ordinary skill in the art will appreciate that the above-described relative position of lenses 214 and the optical fibers connected to ports $202_1$-$202_P$ serves to provide efficient coupling of light in and out the fibers. For example, when an optical fiber operates as an input fiber, a diverging light cone emitted from the fiber tip is transformed into a collimated beam after it passes through the corresponding lens 214. Similarly, when an optical fiber operates as an output fiber, a collimated light beam applied to lens 214 is transformed into a converging light cone that causes the light to efficiently couple through the fiber tip into the fiber core.

In operation, FCA 210 optically couples ports $202_1$-$202_P$ and a MEMS device 220 having a plurality of rotatable mirrors (not individually shown in FIG. 2). The mirrors in MEMS device 220 are arranged in a linear array whose layout generally matches the layout of the array of lenses 214 in FCA 210 and of ports $202_1$-$202_P$. In an example embodiment, MEMS device 220 has one mirror per one port 202. Each of said mirrors in MEMS device 220 may be configured to rotate about two orthogonal rotation axes. Both of said rotation axes lie in the plane that is parallel to a front side 218 of MEMS device 220. One of said rotation axes is also parallel to the Z-coordinate axis and is hereafter referred to as the "vertical" rotation axis. The other of said rotation axes is also parallel to the XY-coordinate plane and is hereafter referred to as the "horizontal" rotation axis.

The mirror-tilt angles in MEMS device 220 are set, as known in the relevant art, by a configuration controller 226. More specifically, configuration controller 226 generates appropriate drive voltages for each mirror and then applies them to the mirrors using a signal bus 224. For each mirror, configuration controller 226 is capable of controlling the rotation angle about the vertical rotation axis independently of the rotation angle about the horizontal rotation axis. Exemplary MEMS devices suitable for use as MEMS device 220 in WSXC device 200 are disclosed, e.g., in U.S. Pat. Nos. 7,126, 250, 6,859,300, and 6,300,619, all of which are incorporated herein by reference in their entirety.

Device 200 further includes two sets $230_1$-$230_2$ of relay/imaging/focusing optics configured to appropriately optically couple the various constituent optical elements of the device, e.g., as further explained below. Although each of optics sets $230_1$-$230_2$ is illustratively shown in FIG. 2 as consisting of a single lens, embodiments of the disclosure are not so limited. In an alternative embodiment, each of optics sets $230_1$-$230_2$ may include any suitable combination of lenses and/or mirrors, e.g., as further described below in reference to FIGS. 6-10. Both cylindrical and spherical lenses may be used. One of ordinary skill in the art will appreciate that, in some embodiments, device 200 may include one or more additional sets of relay/imaging/focusing optics (not explicitly shown in FIG. 2).

Optics set $230_1$ is positioned between MEMS device 220 and a diffraction grating 240. In an example embodiment, optics set $230_1$ is configured to perform one or more of the following optical functions:

(i) To relay light between each mirror of MEMS device 220 and diffraction grating 240;

(ii) To change the beam sizes. For example, it might be beneficial to have a larger beam size for individual optical beams at grating 240 than at MEMS device 220. This size change may enable device 200 to generate tighter-focused light spots at a beam-steering device 250, advantageously resulting in smaller inter-port crosstalk and better spatial separation of the various WDM components at the active surface of the beam-steering device;

(iii) To properly relay to diffraction grating 240 the mirror rotations about the horizontal rotation axes in MEMS device 220. As further explained below, mirror rotations about the horizontal rotation axes enable device 200 to have a variable number of common ports;

(iv) To properly relay the variously steered optical beams from diffraction grating 240 to MEMS device 220. One of ordinary skill in the art will appreciate that using the mirror rotations about the vertical rotation axes MEMS device 220 enables efficient light coupling into the subset of optical ports $202_1$-$202_P$ configured to operate as output ports;

(v) To accommodate dynamic light switching between ports $202_1$-$202_P$ by being a part of an optical imaging system that is configured to image, in a wavelength-dependent manner, each common port onto a corresponding set of plural ports, or vice versa. As explained below, another part of said optical imaging system is optics set $230_2$.

Optics set $230_2$ is positioned between diffraction grating 240 and beam-steering device 250. Diffraction grating 240 is configured to angularly disperse the WDM components of each of the optical beams relayed to it from MEMS device 220, e.g., as indicated in FIG. 2 by a light sector 242 (also see FIG. 10E). Optics set $230_2$ operates to convert the angular dispersion generated by diffraction grating 240 into a spatial separation of the WDM components at a front side 248 of beam-steering device 250, whereat the diffracted sub-beams are focused into respective relatively tight light spots, with each light spot containing light of the corresponding WDM component. A dashed arrow labeled λ indicates in FIG. 2 the direction of the increasing wavelength of the WDM components as they appear at front side 248 of beam-steering device 250.

In various embodiments, beam-steering device 250 may be implemented using (i) a two-dimensional pixelated MEMS mirror array or (ii) a liquid crystal on silicon (LCOS) micro-display. In a MEMS embodiment of beam-steering device 250, the MEMS mirrors in the array can be controllably tilted to steer the corresponding diffracted sub-beams in the respective intended directions. In an LCOS embodiment of beam-steering device 250, the phase shift imparted onto the corresponding optical beam by the individual pixels of the micro-display can be appropriately controlled to create linear optical phase retardation in the direction of the intended deflection of the diffracted sub-beam. In both embodiments, different portions of beam-steering device 250 can be individually configured, using a routing controller 260, to steer the different diffracted sub-beams impinging on the device in different respective directions.

Optics set $230_2$ further operates to relay the sub-beams variously steered by beam-steering device 250 back to diffraction grating 240. Diffraction grating 240 further operates to directionally recombine each of the subsets of the steered sub-beams (WDM components) intended for the same output port into a respective recombined optical beam and direct each of the recombined optical beams, via optics set $230_1$, to a respective one of the mirrors in MEMS device 220. The mirrors in MEMS device 220 then redirect the received recombined optical beams to respective lenses 214 in FCA 210 for coupling into the respective ones of ports $202_1$-$202_P$.

Figure 3A:
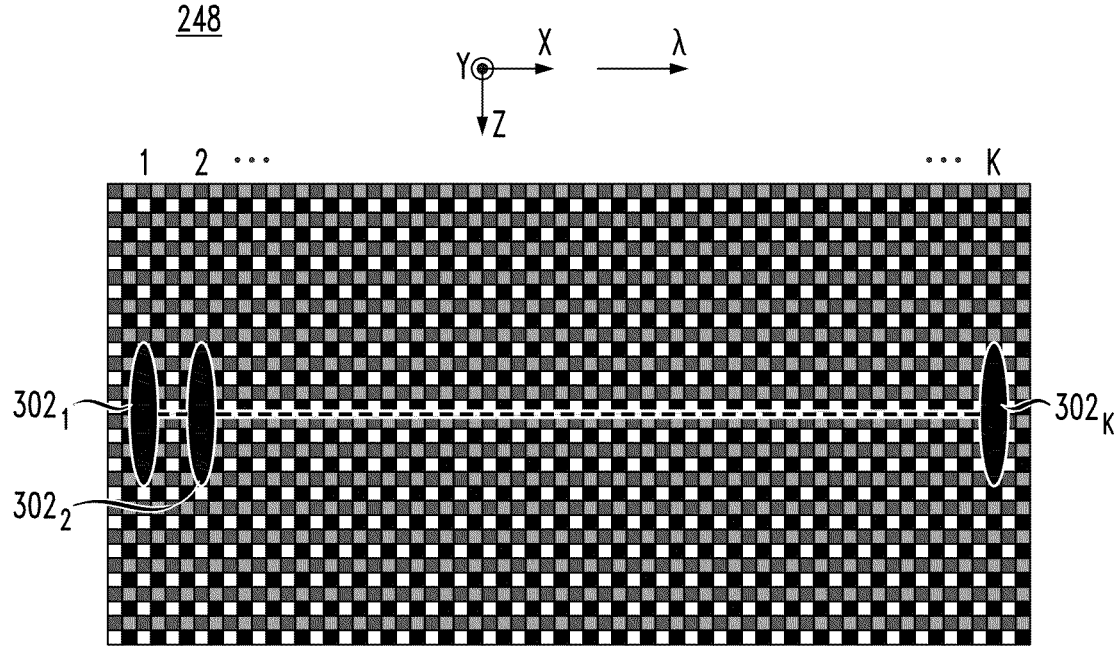
FIGS. 3A-3B show views of a beam-steering device used in the configurable WSXC device shown in FIG. 2 according to an embodiment of the disclosure.
Figure 3B:
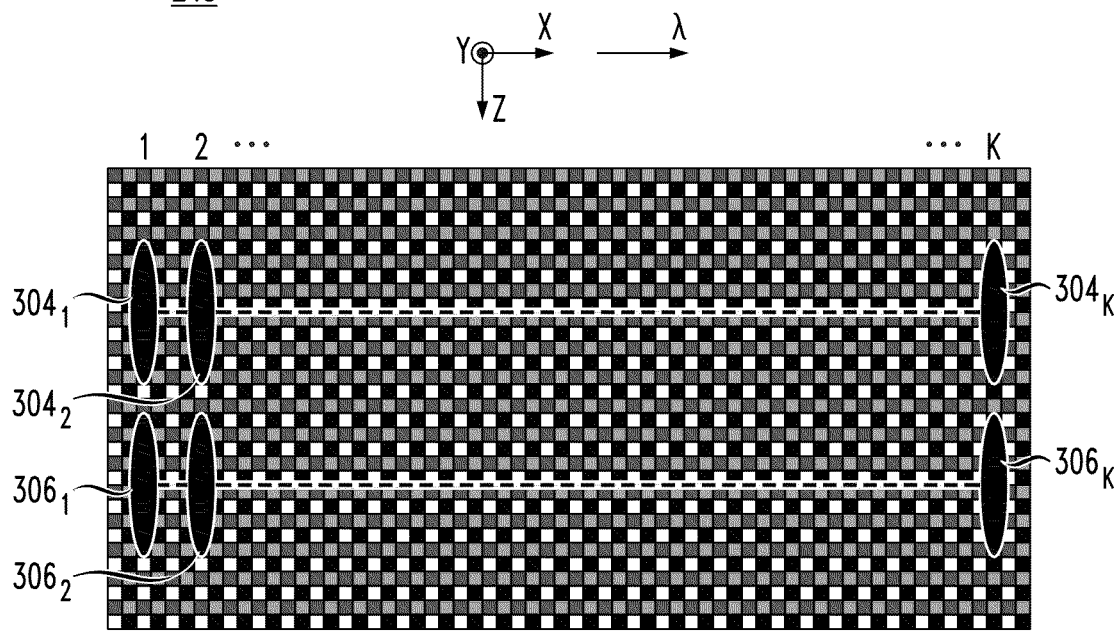

FIGS. 3A-3B show views of front side 248 of beam-steering device 250 according to an embodiment of the disclosure. The orientation of the views shown in FIGS. 3A-3B is indicated in each figure by the respective XYZ coordinate-axis triad, which is the same as the XYZ coordinate-axis triad shown in FIG. 2. FIG. 3A illustrates a first configuration of device 200 in which the device has one common port. FIG. 3B illustrates a second configuration of device 200 in which the device has two common ports.

In the embodiment illustrated by FIGS. 3A-3B, beam-steering device 250 comprises an LCOS micro-display. The individual pixels of the LCOS micro-display are shown in FIGS. 3A-3B as small squares. One of ordinary skill in the art will understand that, in alternative embodiments, other pixel shapes may also be used.

Referring to FIG. 3A, in the first configuration, the mirrors in MEMS device 220 corresponding to the input port(s) are tilted, by rotation about the horizontal rotation axis, such that the light spots generated at front side 248 of beam-steering device 250 are arranged in a single row along the λ direction. For clarity, only three light spots, labeled $302_1$, $302_2$, and $302_K$, are shown. Light spots $302_1$, $302_2$, and $302_K$ correspond to the first, second, and K-th wavelength channels (carrier wavelengths), respectively. By properly deflecting light corresponding to each light spot 302, beam-steering device 250 can cause, e.g., the various WDM components received from the single common port to be individually routed to the intended ones of the plural ports in device 200. One of ordinary skill in the art will understand that signal routing in the reverse direction can be accomplished in a similar manner.

Referring to FIG. 3B, in the second configuration, the mirrors in MEMS device 220 corresponding to the input ports are tilted, by rotation about the horizontal rotation axis, such that the light spots generated at front side 248 of beam-steering device 250 are arranged in two parallel rows, each parallel to the λ direction. For clarity, only three light spots in each of the two rows are shown. The three light spots in the first row are labeled $304_1$, $304_2$, and $304_K$; and the three light spots in the second row are labeled $306_1$, $306_2$, and $306_K$.

The light spots in the first row (e.g., $304_1$-$304_K$) correspond to the first common port and the set of plural ports associated with the first common port. By properly deflecting light corresponding to each light spot 304, beam-steering device 250 can cause, e.g., the various WDM components received from the first common port to be individually routed to the intended ones of the plural ports associated with the first common port in device 200. One of ordinary skill in the art will understand that signal routing in the reverse direction can be accomplished in a similar manner.

The light spots in the second row (e.g., $306_1$-$306_K$) correspond to the second common port and the set of plural ports associated with the second common port. By properly deflecting light corresponding to each light spot 306, beam-steering device 250 can cause, e.g., the various WDM components received from the second common port to be individually routed to the intended ones of the plural ports associated with the second common port in device 200. One of ordinary skill in the art will understand that signal routing in the reverse direction can be accomplished in a similar manner.

Figure 4:
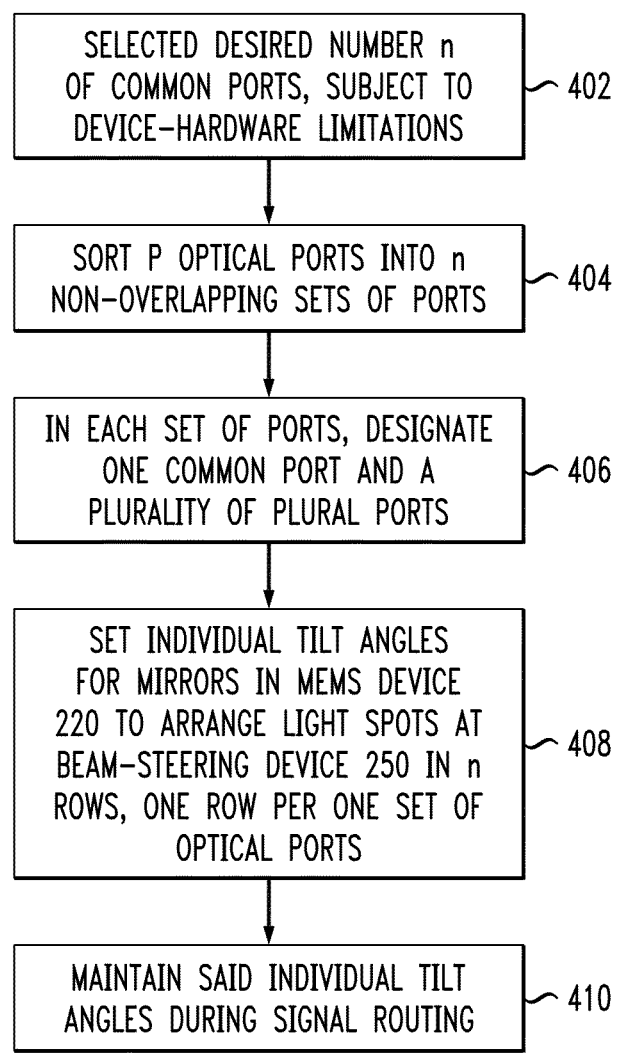
FIG. 4 shows a flowchart of a configuration method that can be used to configure the configurable WSXC device shown in FIG. 2 to have a desired number of common ports therein according to an embodiment of the disclosure.

FIG. 4 shows a flowchart of a configuration method 400 that can be used to configure device 200 (FIG. 2) to have a desired number of common ports according to an embodiment of the disclosure.

At step 402 of method 400 the number n of common ports is specified or selected. In principle, the number n can be any positive integer. However, the hardware of device 200 may limit the maximum value of n that can be used at step 402. For example, one limitation may be that 3n≤P. This limitation reflects the fact that a wavelength-selective switch 120 or 140 (see FIG. 1) has a minimum of three ports. Another limitation may be related to the vertical (along the Z-axis) physical size of beam-steering device 250 and is expressed by Eq. (1):

$$n \leq Z_0/a \qquad (1)$$

where $Z_0$ is the vertical size of the active area of beam-steering device 250, and a is the vertical spot size (e.g., of light spots 302, 304, and/or 306) at front side 248 of beam-steering device 250. One of ordinary skill in the art will understand that Eq. (1) expresses the fact that, due to its finite physical size, the active area of beam-steering device 250 can accommodate only a limited number of light-spot rows analogous to the two light-spot rows shown in FIG. 3B. Yet another limitation may be related to the range of mirror-rotation angles supported by MEMS device 220.

At step 404, the P optical ports $202_1$-$202_P$ of device 200 are sorted into n non-overlapping sets of ports, with each port set having at least three ports. In some configurations, at least some of the n port sets may contain different respective numbers of ports.

At step 406, in each of the n port sets defined at step 404, one optical port is designated as a common port and the remaining optical ports are designated as plural ports.

FIGS. 5A-5B show example results of steps 404 and 406 according to an embodiment of the disclosure.

FIG. 5A corresponds to n=1. Optical port $202_1$ is designated as the single common port. Optical ports $202_2$-$202_P$ are designated as the corresponding plural ports.

FIG. 5B corresponds to n=2. The first set of ports, designated as Set A, contains optical ports $202_1$-$202_Q$. The second set of ports, designated as Set B, contains optical ports $204_{Q+1}$-$202_P$. In Set A, port $202_1$ is designated as the common port of the set, and optical ports $202_2$-$202_Q$ are designated as the plural ports of the set. In Set B, port $202_P$ is designated as the common port of the set, and optical ports $204_{Q+1}$-$202_{P-1}$ are designated as the plural ports of the set.

In some configurations, Q=P−Q. In some alternative configurations, Q≠P−Q. The common port of the set does not have to be located at an outer geometric boundary of the set and, in some configurations, may be located, e.g., near the geometric middle of the set. All ports of the same set need not be located in a single contiguous (uninterrupted) portion of the port array. In some configurations, optical ports of the same set may be located in two or more contiguous portions of the port array, said two or more contiguous portions being separated from one another by optical ports belonging to one or more other sets. In some embodiments, optical ports belonging to different sets may be arranged in an interleaved manner.

Referring back to FIG. 4, at step 408, MEMS device 220 is configured to cause the light spots generated by the optical input port(s) of each port set at front side 248 of beam-steering device 250 to be arranged in a single respective row, for a total of n such light-spot rows. This can be achieved, e.g., by setting appropriate respective tilt angles for the corresponding mirrors in MEMS device 220, e.g., by rotating each of said mirrors about its horizontal rotation axis. FIG. 3B shows an example result of step 408 for n=2.

At step 410, MEMS device 220 is configured to maintain the individual tilt angles set at step 408 during signal routing. Note however that only the tilt angles corresponding to the mirror rotations about the horizontal rotation axes need to be maintained in MEMS device 220 to preserve the corresponding device configuration during signal routing. In contrast, the tilt angles corresponding to the mirror rotations about the vertical rotation axes can be dynamically changed to accommodate signal switching from one port of a port set to another port of that port set.

The device configuration produced by method 400 enables device 200 to operate as a bank of n independent wavelength-selective switches. Each of said n independent wavelength-selective switches contains the optical ports of the respective one of the n port sets defined at step 404. Recall that, after step 406, each of the n port sets has a respective designated common port and a respective plurality of plural ports. Accordingly, in operation, MEMS device 220 routes optical signals between the common port and the plural ports of the same port set. Typically, device 200 is programmed such as not to allow signal crossing from one port set to another port set.

Figure 6:
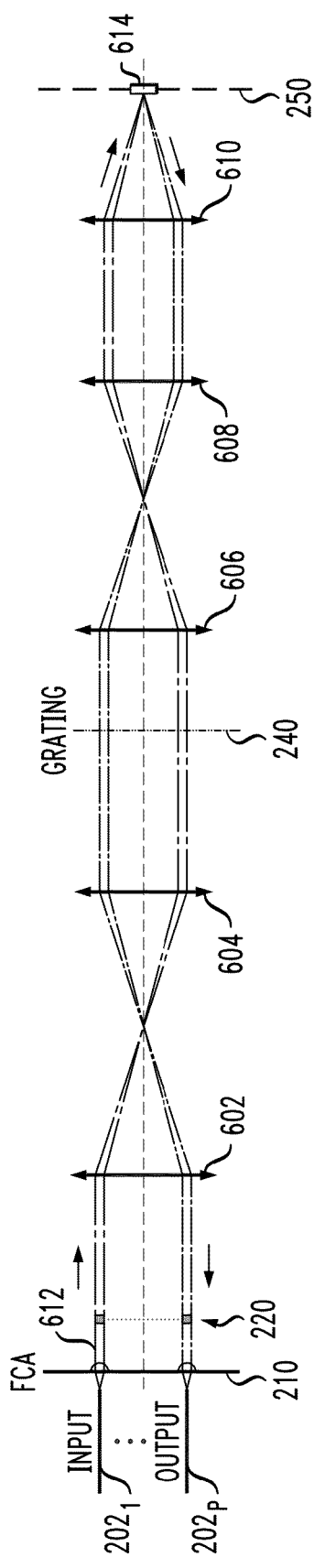
FIGS. 6-9 schematically show optical-beam propagation in four representative configurations of the configurable WSXC device shown in FIG. 2 according to an embodiment of the disclosure.
Figure 7:
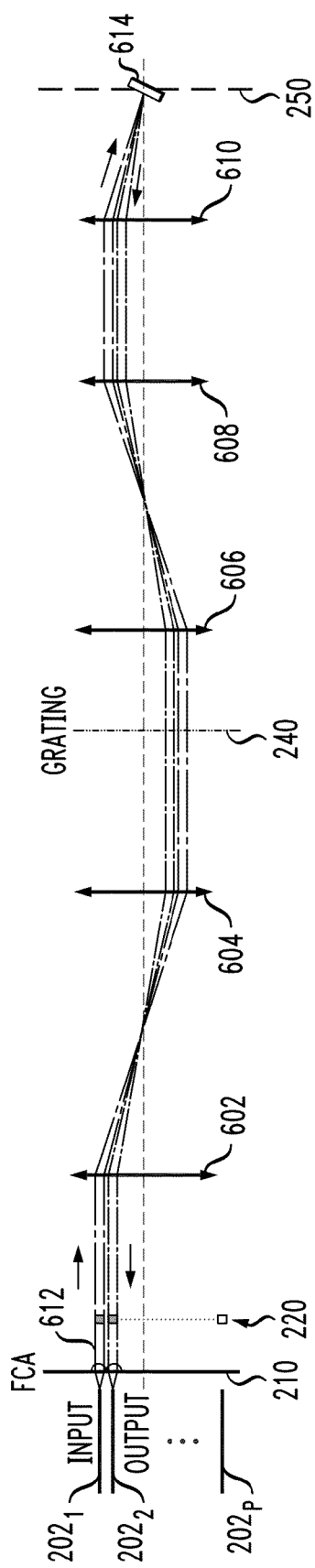
Figure 8:
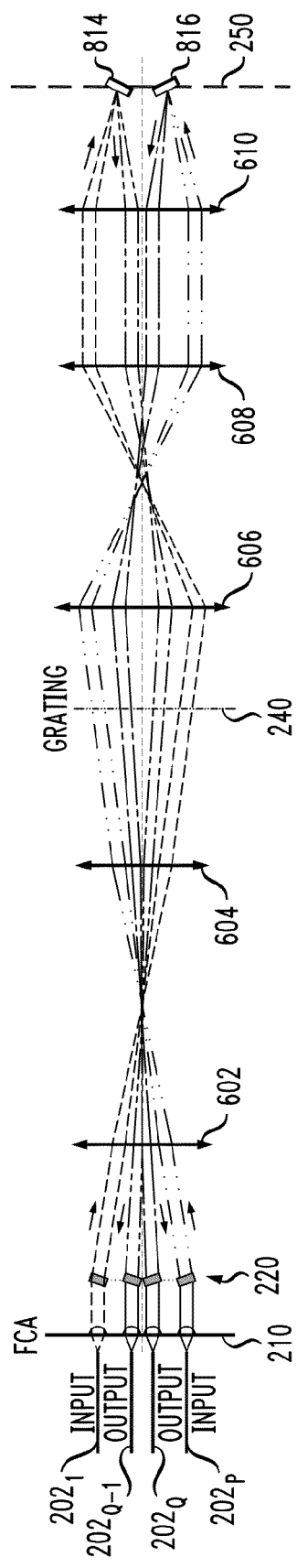
Figure 9:
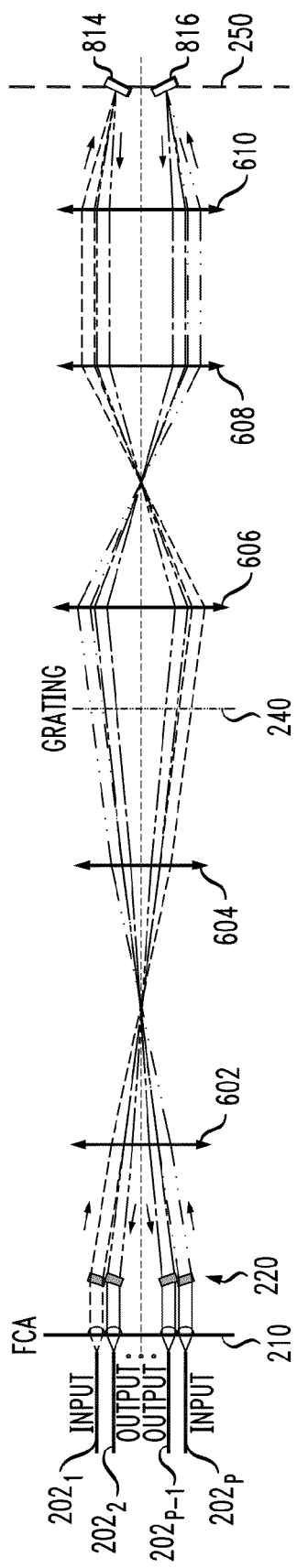

FIGS. 6-9 schematically show optical-beam propagation in four representative routing configurations of device 200 (FIG. 2) according to an embodiment of the disclosure. More specifically, the routing configurations shown in FIGS. 6 and 7 correspond to n=1 (i.e., when device 200 is configured to operate with a single common port). The optical port assignment corresponding to FIGS. 6 and 7 is shown in FIG. 5A. A comparison of FIGS. 6 and 7 illustrates how beam switching from one of the plural ports to another is accomplished. The routing configurations shown in FIGS. 8 and 9 correspond to n=2 (i.e., when device 200 is configured to operate with two common ports). The optical port assignment corresponding to FIGS. 8 and 9 is shown in FIG. 5B. A comparison of FIGS. 8 and 9 illustrates how beam switching from one of the plural ports to another in each of the two port sets is accomplished. For illustration purposes, FIGS. 6-9 illustrate signal switching for a single WDM component (modulated carrier wavelength). One of ordinary skill in the art will understand that signal switching for multiple WDM components can be performed in a similar manner using different respective portions of beam-steering device 250.

In the example shown in FIG. 6, port $202_1$ is the single common port, which is configured to operate as an input port. FCA 210 collimates the light received through port $202_1$ and directs a resulting collimated optical beam 612 to a corresponding mirror in MEMS device 220. Lenses 602 and 604, which are both parts of optics set $230_1$, operate to image the mirror plane of MEMS device 220 onto diffraction grating 240. Lenses 606, 608, and 610, which are all parts of optics set $230_2$, operate to relay light from diffraction grating 240 to beam-steering device 250. Lens 610 further operates to focus light on front side 248 of beam-steering device 250 to generate light spots 302 (see FIG. 3A). A portion 614 of the active surface in beam-steering device 250 is configured to appropriately redirect the received light back toward MEMS device 220 such that, after propagating in the reverse direction through lenses 610, 608, and 606, being diffracted by grating 240, and propagating through lenses 604 and 602, the redirected optical beam impinges onto the mirror in MEMS device 220 corresponding to port $202_P$. Said mirror then redirects the received optical beam to the corresponding lens in FCA 210 for coupling into port $202_P$.

FIG. 7 shows how the propagation path for optical beam 612 changes in device 200 when the intended output port becomes port $202_2$ instead of port $202_P$. More specifically, to change the output port from port $202_P$ to $202_2$, portion 614 of the active surface in beam-steering device 250 is reconfigured to redirect the received light back toward MEMS device 220 at a different angle. This angle is such that the redirected optical beam now impinges onto the mirror in MEMS device 220 corresponding to port $202_2$ instead of the mirror corresponding to port $202_P$. That mirror then redirects the received optical beam to the corresponding lens in FCA 210 for coupling into port $202_2$.

To further change the output port, routing controller 260 (FIG. 2) may act to reconfigure portion 614 of the active surface in beam-steering device 250 to redirect the received light back toward MEMS device 220 at a different respective angle selected from the range between the angle shown in FIG. 6 and the angle shown in FIG. 7.

In the examples shown in FIGS. 8 and 9, device 200 operates as a switch bank having two wavelength-selective switches, each analogous to wavelength-selective switches 120 (see FIG. 1). The first of the two switches includes optical ports $202_1$ through $202_{Q-1}$, and is a 1×(Q−2) wavelength-selective switch. Optical port $202_1$ is the common port in the first switch, which is configured to operate as an input port. Optical ports $202_2$-$202_{Q-1}$ are the plural ports in the first switch, which are configured to operate as output ports. The second of the two switches includes optical ports $202_Q$ through $202_P$, and is a 1×(P−Q) wavelength-selective switch. Optical port $202_P$ is the common port in the second switch, which is configured to operate as an input port. Optical ports $202_Q$-$202_{P-1}$ are the plural ports in the second switch, which are configured to operate as output ports.

Optical beam propagation in each of the two individual switches in the switch bank of FIGS. 8-9 is similar to that described above in reference to FIG. 6. However, one difference is that the mirrors in MEMS device 220 are now tilted to cause (i) optical ports in the first switch to be optically coupled to a portion 814 of the active surface in beam-steering device 250 and (ii) optical ports in the second switch to be optically coupled to a portion 816 of the active surface in beam-steering device 250, with portions 814 and 816 being vertically offset with respect to each other as indicated in FIGS. 8-9.

In the routing configuration of FIG. 8, portion 814 of the active surface in beam-steering device 250 is configured to redirect the received light at an angle that causes the redirected optical beam to impinge onto the mirror in MEMS device 220 corresponding to port $202_{Q-1}$. Said mirror then redirects the received optical beam to the corresponding lens in FCA 210 for coupling into port $202_{Q-1}$. Portion 816 of the active surface in beam-steering device 250 is similarly configured to redirect the received light at an angle that causes the redirected optical beam to impinge onto the mirror in MEMS device 220 corresponding to port 202$_Q$. Said mirror then redirects the received optical beam to the corresponding lens in FCA 210 for coupling into port 202$_Q$.

FIG. 9 shows how the optical-beam propagation paths change in device 200 when (i) the intended output port in the first switch becomes port 202$_2$ instead of port 202$_{Q-1}$, and (ii) the intended output port in the second switch becomes port 202$_{P-1}$ instead of port 202$_Q$. More specifically, to change the output port from port 202$_{Q-1}$ to 202$_2$ in the first of the two switches, portion 814 of the active surface in beam-steering device 250 is reconfigured to redirect the received light back toward MEMS device 220 at a different angle. This angle is such that the redirected optical beam now impinges onto the mirror in MEMS device 220 corresponding to port 202$_2$ instead of the mirror corresponding to port 202$_{Q-1}$. That mirror then redirects the received optical beam to the corresponding lens in FCA 210 for coupling into port 202$_2$. To change the output port from port 202$_Q$ to 202$_{P-1}$ in the second of the two switches, portion 816 of the active surface in beam-steering device 250 is reconfigured to redirect the received light back toward MEMS device 220 at a different angle. This angle is such that the redirected optical beam now impinges onto the mirror in MEMS device 220 corresponding to port 202$_{P-1}$ instead of the mirror corresponding to port 202$_Q$. That mirror then redirects the received optical beam to the corresponding lens in FCA 210 for coupling into port 202$_{P-1}$.

To further change the output port in any of the two switches of FIGS. 8-9, routing controller 260 (FIG. 2) may act to reconfigure the respective one of portions 814 and 816 of the active surface in beam-steering device 250 to redirect the received light back toward MEMS device 220 at a different respective angle selected from the range between the respective angle shown in FIG. 8 and the angle respective shown in FIG. 9.

Figure 10A:
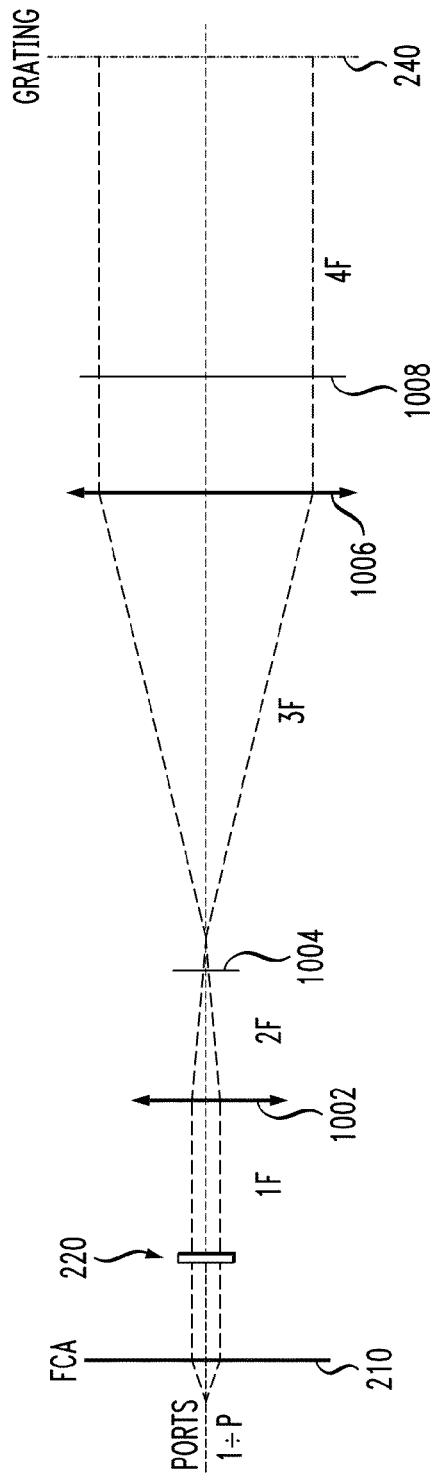
FIGS. 10A-10E schematically show optical coupling between the various optical elements of the configurable WSXC device shown in FIG. 2 according to an embodiment of the disclosure.
Figure 10B:
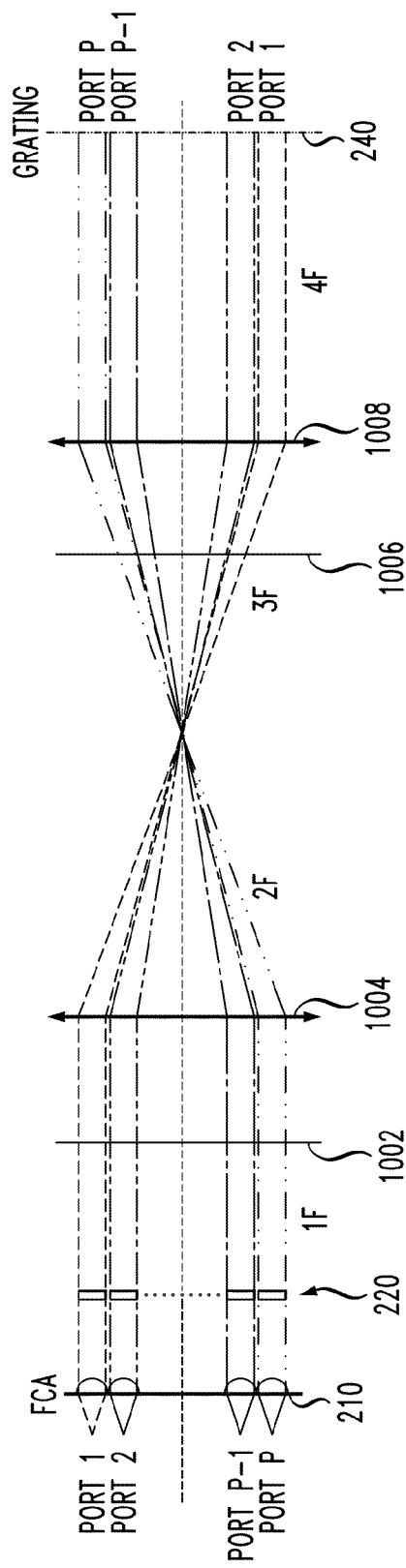
Figure 10C:
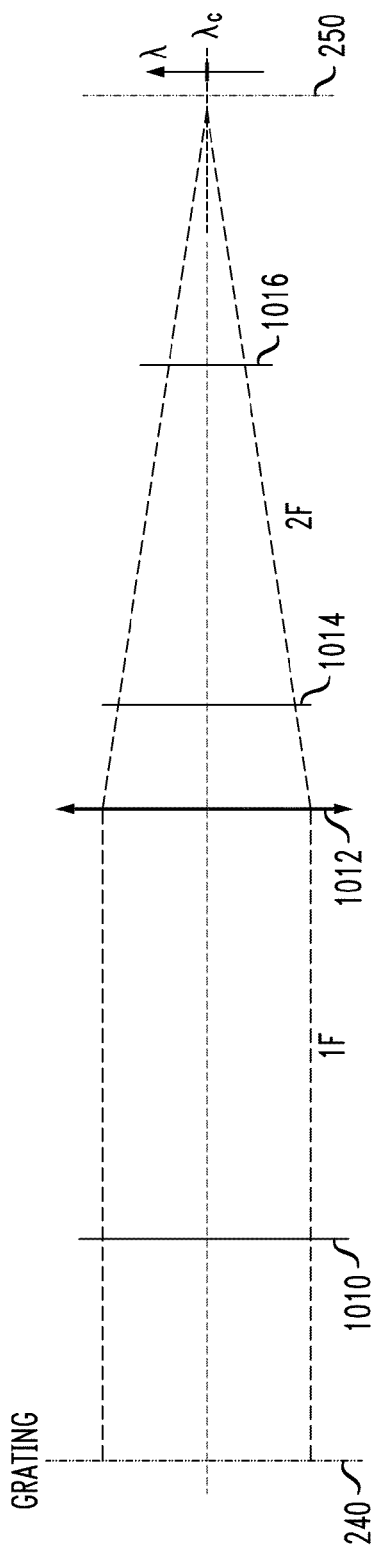
Figure 10D:
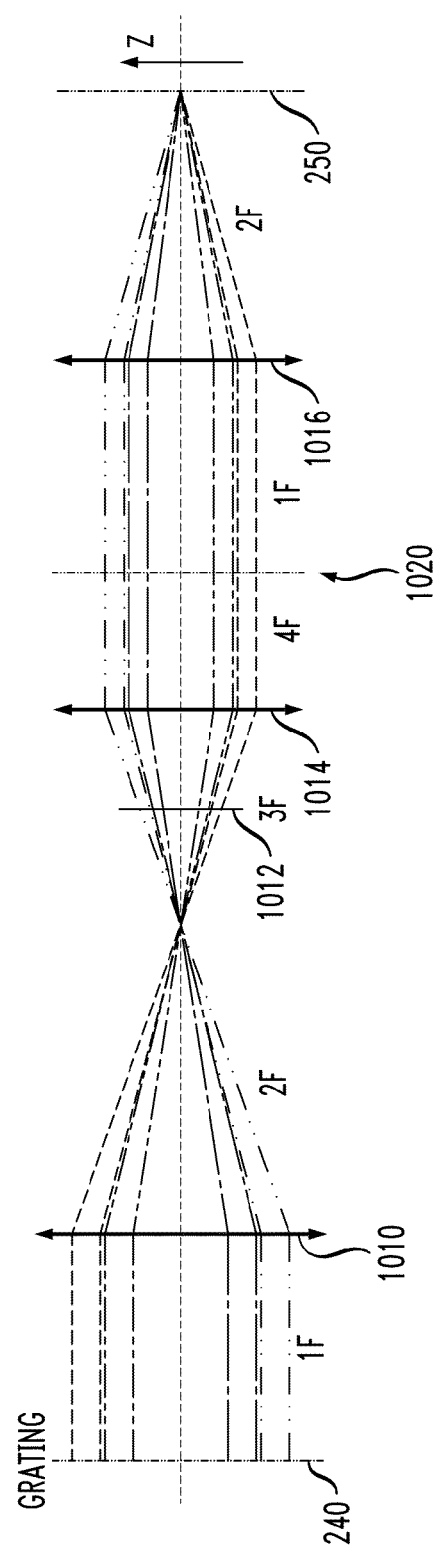

FIGS. 10A-10E show optical diagrams that illustrate optical coupling between the various optical elements in device 200 according to an embodiment of the disclosure. More specifically, FIGS. 10A and 10B are the top and side views, respectively, that show the optical-ray tracing in device 200 in the device portion located between optical ports 202$_1$-202$_P$ and diffraction grating 240. FIGS. 10C and 10D are the similar top and side views, respectively, that show the optical-ray tracing in device 200 in the device portion located between diffraction grating 240 and beam-steering device 250. For clarity, only the optical-ray tracing corresponding to the center wavelength ($\lambda_c$) of the nominal wavelength range used in device 200 is shown in FIGS. 10A-10D. The optical-ray tracing for multiple wavelengths in the device portion located between diffraction grating 240 and beam-steering device 250 is further illustrated in FIG. 10E.

In the embodiment shown in FIGS. 10A and 10B, optics set 230$_1$ (see FIG. 2) comprises four cylindrical lenses 1002-1008. The cylindrical axes of lenses 1002 and 1006 are parallel to one another and are orthogonal to the plane of FIG. 10A. The cylindrical axes of lenses 1004 and 1008 are parallel to one another and are parallel to the plane of FIG. 10A.

Lenses 1002 and 1006 have different focal lengths and are arranged to form a magnifying 4F relay system. For the dimension shown in FIG. 10A, this magnification causes the beam size at diffraction grating 240 to be larger than the beam size at MEMS device 220. Lenses 1004 and 1008 have the same focal length and are similarly arranged to form a (non-magnifying) 4F relay system. For the dimension shown in FIG. 10B, this relay system images the mirror plane of MEMS device 220 onto diffraction grating 240.

In the embodiment shown in FIGS. 10C and 10D, optics set 230$_2$ (see FIG. 2) comprises four cylindrical lenses 1010-1016. The cylindrical axis of lens 1012 is orthogonal to the plane of FIG. 10C. The cylindrical axes of lenses 1010, 1014, and 1016 are parallel to one another and are also parallel to the plane of FIG. 10C.

Lens 1012 has a focal length that is one half of the distance between diffraction grating 240 and beam-steering device 250. As a result, both diffraction grating 240 and beam-steering device 250 are located in the respective focal planes of lens 1012. This enables the light spots generated on the active surface of beam-steering device 250 to have a relatively small size along the $\lambda$ direction, which is indicated by the corresponding arrows in both FIGS. 10C and 2.

Lenses 1010 and 1014 have different focal lengths and are arranged to form a de-magnifying 4F relay system. This 4F relay system operates to image the plane of diffraction grating 240 onto a (virtual) plane 1020. For the dimension shown in FIG. 10D, this de-magnification causes the beam sizes at diffraction grating 240 to be larger than the beam sizes at plane 1020.

Lens 1016 has a focal length that is one half of the distance between plane 1020 and beam-steering device 250. As a result, both plane 1020 and beam-steering device 250 are located in the respective focal planes of lens 1016. Due to the fact that the focal length of lens 1016 is smaller than the focal length of lens 1012, the light spots generated on the active surface of beam-steering device 250 have a larger size along the vertical (Z-coordinate) axis than along the $\lambda$ direction. Examples of the light-spot shapes due to this effect are shown in FIGS. 3A-3B.

Figure 10E:
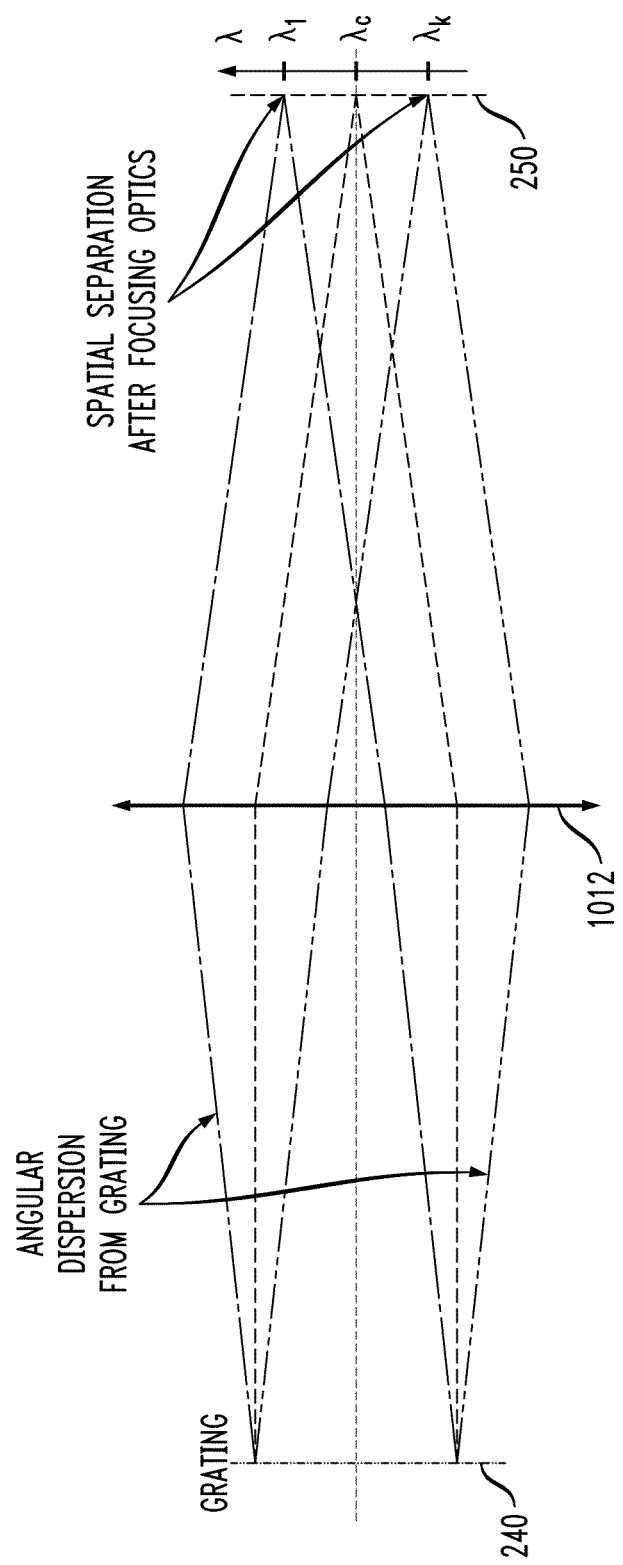

FIG. 10E further illustrates how lens 1012 transforms the angular wavelength dispersion generated by diffraction grating 240 into the spatial separation of the light spots corresponding to different WDM channels at beam-steering device 250. For illustration purposes, only three optical beams corresponding to three different wavelengths ($\lambda_1, \lambda_c,$ and $\lambda_K$) are shown in FIG. 10E. Wavelength $\lambda_1$ is the carrier wavelength of the first of the K WDM channels in device 200. As already indicated above, wavelength $\lambda_c$ is the center wavelength of the nominal wavelength range corresponding to the K WDM channels in device 200. Wavelength $\lambda_K$ is the carrier wavelength of the K-th of the K WDM channels in device 200. One of ordinary skill in the art will understand that other carrier wavelength are projected onto beam-steering device 250 at the respective positions between those of wavelengths $\lambda_1$ and $\lambda_K$ along the $\lambda$ direction.

According to an example embodiment disclosed above in reference to FIGS. 1-10, provided is an apparatus comprising: an array of optical ports (e.g., 202$_1$-202$_P$, FIGS. 2, 5A-5B), wherein an optical port is configurable to operate as a common port of a wavelength-selective switch or a plural port of a wavelength-selective switch; and a MEMS mirror array (e.g., 220, FIGS. 2, 6-9, 10A-10D) having a plurality of individually tiltable mirrors, wherein a tiltable mirror is configured to receive light from or direct light to a respective one of the optical ports in the array of optical ports and is tiltable in a manner that enables at least a first configuration and a second configuration of the array of optical ports. In the first configuration (e.g., shown in FIG. 5A), the array of optical ports has a single common port and a corresponding plurality of plural ports that are configured as a common port and plural ports, respectively, of a first wavelength-selective switch. In the second configuration (e.g., shown in FIG. 5B), the array of optical ports has a first common port, a second common port, a first plurality of plural ports, and a second plurality of plural ports, wherein: the first common port and the first plurality of plural ports are configured as a common port and plural ports, respectively, of a second wavelength-selective switch; and the second common port and the second plurality of plural ports are configured as a common port and plural ports, respectively, of a third wavelength-selective switch.

In some embodiments of the above apparatus, the second wavelength-selective switch and the third wavelength-selective switch have no optical ports in common.

In some embodiments of any of the above apparatus, the first wavelength-selective switch is a 1×$N_1$ wavelength-selective switch, wherein $N_1$+1≤P, where P is a total number of ports in the array of optical ports; the second wavelength-selective switch is a 1×$N_2$ wavelength-selective switch; and the third wavelength-selective switch is a 1×$N_3$ wavelength-selective switch, wherein $N_2$+$N_3$+2≤P.

In some embodiments of any of the above apparatus, $N_2$=$N_3$.

In some embodiments of any of the above apparatus, an optical port that is configured to operate as the single common port in the first configuration is configurable to operate as one of the first and second common ports in the second configuration (for example, port $202_1$ in FIGS. 5A-5B).

In some embodiments of any of the above apparatus, an optical port that is configured to operate as one of the plural ports in the first configuration is configurable to operate as one of the first and second common ports in the second configuration (for example, port $202_P$ in FIGS. 5A-5B).

In some embodiments of any of the above apparatus, in a third configuration, the array of optical ports has a set of three common ports and three non-overlapping pluralities of plural ports, wherein: a first common port in said set of three common ports and a first of the three non-overlapping pluralities of plural ports are configured as a common port and plural ports, respectively, of a fourth wavelength-selective switch; a second common port in said set of three common ports and a second of the three non-overlapping pluralities of plural ports are configured as a common port and plural ports, respectively, of a fifth wavelength-selective switch; and a third common port in said set of three common ports and a third of the three non-overlapping pluralities of plural ports are configured as a common port and plural ports, respectively, of a sixth wavelength-selective switch.

In some embodiments of any of the above apparatus, the fourth wavelength-selective switch is a 1×$N_4$ wavelength-selective switch; the fifth wavelength-selective switch is a 1×$N_5$ wavelength-selective switch; and the sixth wavelength-selective switch is a 1×$N_6$ wavelength-selective switch, wherein $N_4$+$N_5$+$N_6$+3≤P, where P is a total number of ports in the array of optical ports.

In some embodiments of any of the above apparatus, a beam-steering device (e.g., 250, FIG. 2) optically coupled to the MEMS mirror array; and a spectrally dispersive element (e.g., 240, FIG. 2) optically coupled between the MEMS mirror array and the beam-steering device in a manner that enables the beam-steering device to steer any of a plurality of carrier wavelengths (e.g., $\lambda_1$, $\lambda_c$, and $\lambda_K$, FIG. 10E) received from a respective common port of any of the first, second, and third wavelength-selective switches to any plural port in the respective plurality of plural ports.

In some embodiments of any of the above apparatus, in the second configuration, the tiltable mirrors in the MEMS mirror array are individually tilted to cause the spectrally dispersive element to: disperse light corresponding to the second wavelength-selective switch in a dispersion direction (e.g., λ direction, FIGS. 2, 3A, 3B, 10C, 10E) across the beam-steering device at a first position; and disperse light corresponding to the third wavelength-selective switch in said dispersion direction across the beam-steering device at a second position that is offset with respect to the first position (e.g., as shown in FIGS. 3B, 8, and 9).

In some embodiments of any of the above apparatus, the beam-steering device comprises a pixelated liquid-crystal-on-silicon micro-display (e.g., 248, FIGS. 3A-3B).

In some embodiments of any of the above apparatus, the beam-steering device comprises a two-dimensional pixelated array of tiltable mirrors (e.g., including mirrors 614, 814, and 816 shown in FIGS. 6-9).

In some embodiments of any of the above apparatus, the apparatus further comprises: a first optics set (e.g., $230_1$, FIG. 2) configured to image a mirror plane of the MEMS mirror array onto the spectrally dispersive element; and a second optics set (e.g., $230_2$, FIG. 2) configured to convert angular dispersion of the plurality of carrier wavelengths generated by the spectrally dispersive element into a spatial separation of the plurality of carrier wavelengths at the beam-steering device.

In some embodiments of any of the above apparatus, at least one of the first and second optics sets includes at least one cylindrical lens (e.g., 1002 and 1012, FIGS. 10A-10D).

In some embodiments of any of the above apparatus, the array of optical ports is a linear array (e.g., as shown in FIGS. 5A-5B).

In some embodiments of any of the above apparatus, the apparatus further comprises a configuration controller (e.g., 226, FIG. 2) configured to change tilt angles of the mirrors MEMS mirror array to convert one of the first and second configurations into the other of the first and second configurations.

In some embodiments of any of the above apparatus, in the second configuration: one of the first common port and the second common port is configured to operate as an input port; and the other one of the first common port and the second common port is configured to operate as an output port According to another example embodiment disclosed above in reference to FIGS. 1-10, provided is a method of configuring a WSXC device, the method comprising the steps of: (A) sorting (e.g., step 404, FIG. 4) P optical ports (e.g., $202_1$-$202_P$, FIGS. 2, 5A-5B) of the WSXC device into n non-overlapping sets of ports, where P is a positive integer greater than five and n is a positive integer greater than one; (B) in each of said n non-overlapping sets of ports, designating (e.g., step 406, FIG. 4) one common port and a respective plurality of plural ports; and (C) individually tilting (e.g., step 408, FIG. 4) tiltable mirrors in a MEMS mirror array (e.g., 220, FIG. 2) of the WSXC device to cause a spectrally dispersive element (e.g., 240, FIG. 2) of the WSXC device to disperse light across a beam-steering device (e.g., 250, FIG. 2) of the WSXC device at n different positions that are offset from one another in a direction orthogonal to a dispersion direction (e.g., λ direction, FIGS. 2, 3A, 3B, 10C, 10E) such that each position is configured to receive light from a respective one of the n non-overlapping sets of ports.

In some embodiments of the above method, the method further comprises the step of configuring the WSXC device to operate as a bank of n wavelength-selective switches, each being configured to route light between the optical ports of a respective one of the n non-overlapping sets of ports (e.g., as shown in FIGS. 3B, 8, and 9 for n=2).

In some embodiments of any of the above methods, the method further comprises the step of reconfiguring the WSXC device to change the number n.

According to yet another example embodiment disclosed above in reference to FIGS. 1-10, provided is an apparatus comprising an optical routing device (e.g., 200, FIG. 2) that comprises an array of MEMS mirrors (e.g., 220, FIG. 2) and a wavelength-selective optical router (e.g., including 240, 250, 260; FIG. 2) being optically connected to an array of P optical ports (e.g., $202_1$-$202_P$, FIGS. 2, 5A-5B) by the array of MEMS mirrors. The MEMS mirrors are configurable to connect the optical ports of the array of the P optical ports to the wavelength-selective optical router in different first and second configurations, the optical routing device being configured to operate some of the optical ports of the array of the P optical ports as a 1×$N_1$ first optical wavelength-selective switch in the first configuration with $N_1$ being smaller than P and greater than one, and being configured to operate some of the optical ports of the array of the P optical ports as a 1×$N_2$ second optical wavelength-selective switch and a 1×$N_3$ third optical wavelength-selective switch in the second configuration with the integers $N_2$ and $N_3$ each being greater than one and where $N_2+N_3+2 \leq P$.

In some embodiments of the above apparatus, the integers $N_2$ and $N_3$ are each greater than or equal to $(P-2)/4$.

In some embodiments of any of the above apparatus, the apparatus further comprises an electronic controller (e.g., 226, FIG. 2) connected to operate the array of MEMS mirrors, the electronic controller being capable of operating the MEMS mirrors such that the optical ports of the array of the P optical ports and the wavelength-selective optical router are capable of being connected in any of the first and second configurations.

In some embodiments of any of the above apparatus, the apparatus further comprises a reconfigurable optical add-drop multiplexer (e.g., 100, FIG. 1), the reconfigurable optical add-drop multiplexer including the optical routing device.

In some embodiments of any of the above apparatus, the MEMS mirrors are configured to translate via piston-like movements. In particular, a conventional array of mirrors that make piston-like motions can be configured to redirect a light beam in a desired direction. For example, the individual mirrors can be translated to form a staircase such that interference between light sub-beams reflected by different steps of the staircase causes the redirection of the combined light beam in the direction of linear optical phase retardation.

In some embodiments of any of the above apparatus, the MEMS mirrors are configured to perform tilt motions (e.g., as indicated in FIGS. 6-9).

In some embodiments of any of the above apparatus, the wavelength-selective optical router includes a second array of MEMS mirrors (e.g., 250, FIG. 2) or an array of liquid-crystal-on-semiconductor (LCOS) elements (e.g., 250, FIG. 2).

While this invention has been described with reference to illustrative embodiments, this description is not intended to be construed in a limiting sense.

Although various embodiments have been described in reference to the use of MEMS device 220, embodiments of the invention are not so limited. Other types of beam-steering devices, such as LCOS micro-displays, can similarly be used instead of MEMS device 220.

Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, microsystems, and devices produced using microsystems technology or microsystems integration.

Although the present invention has been described in the context of implementation as MEMS devices, embodiments of the invention can in theory be implemented at any scale, including scales larger than micro-scale.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors" and "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
   a reconfigurable wavelength-selective optical router; and
   a MEMS mirror array having a plurality of individually movable mirrors, wherein each of the movable mirrors is configured to receive light from or direct light to a respective one optical port in an array of optical ports and is configurable to optically couple the optical ports in at least a first configuration and a second configuration, wherein:
       in the first configuration, the array of optical ports has a single common port and a plurality of plural ports that are configured as a common port and respective plural ports of a first wavelength-selective switch; and
       in the second configuration, the array of optical ports has a first common port, a second common port, a first plurality of plural ports, and a second plurality of plural ports, wherein:
           the first common port and the first plurality of plural ports are configured as a common port and respective plural ports of a second wavelength-selective switch; and
           the second common port and the second plurality of plural ports are configured as a common port and respective plural ports of a third wavelength-selective switch.

2. The apparatus of claim 1, wherein the second wavelength-selective switch and the third wavelength-selective switch have no optical ports in common.

3. The apparatus of claim 1, wherein:
   the first wavelength-selective switch is a $1 \times N_1$ wavelength-selective switch, wherein $N_1+1 \leq P$, where P is a total number of ports in the array of optical ports;
   the second wavelength-selective switch is a $1 \times N_2$ wavelength-selective switch; and
   the third wavelength-selective switch is a $1 \times N_3$ wavelength-selective switch, wherein $N_2+N_3+2 \leq P$.

4. The apparatus of claim 3, wherein $N_2=N_3$.

5. The apparatus of claim 1, wherein an optical port that is configured to operate as the single common port in the first configuration is configurable to operate as one of the first and second common ports in the second configuration.

6. The apparatus of claim 1, wherein an optical port that is configured to operate as one of the plural ports in the first configuration is configurable to operate as one of the first and second common ports in the second configuration.

7. The apparatus of claim 1, wherein, in a third configuration, the array of optical ports has a set of three common ports and three non-overlapping pluralities of plural ports, wherein:
   a first common port in said set of three common ports and a first of the three non-overlapping pluralities of plural ports are configured as a common port and plural ports, respectively, of a fourth wavelength-selective switch;
   a second common port in said set of three common ports and a second of the three non-overlapping pluralities of plural ports are configured as a common port and plural ports, respectively, of a fifth wavelength-selective switch; and
   a third common port in said set of three common ports and a third of the three non-overlapping pluralities of plural ports are configured as a common port and plural ports, respectively, of a sixth wavelength-selective switch.

8. The apparatus of claim 7, wherein:
   the fourth wavelength-selective switch is a $1 \times N_4$ wavelength-selective switch;
   the fifth wavelength-selective switch is a $1 \times N_5$ wavelength-selective switch; and
   the sixth wavelength-selective switch is a $1 \times N_6$ wavelength-selective switch, wherein $N_4+N_5+N_6+3 \leq P$, where P is a total number of ports in the array of optical ports.

9. The apparatus of claim 1, wherein the reconfigurable wavelength-selective optical router comprises:
   a beam-steering device optically coupled to the MEMS mirror array; and
   a spectrally dispersive element optically coupled between the MEMS mirror array and the beam-steering device in a manner that enables the beam-steering device to steer any of a plurality of carrier wavelengths received from a respective common port of any of the first, second, and third wavelength-selective switches to any plural port in the respective plurality of plural ports.

10. The apparatus of claim 9, wherein, in the second configuration, the movable mirrors in the MEMS mirror array are individually tilted to cause the spectrally dispersive element to:
  disperse light corresponding to the second wavelength-selective switch in a dispersion direction across the beam-steering device at a first position; and
  disperse light corresponding to the third wavelength-selective switch in said dispersion direction across the beam-steering device at a second position that is offset with respect to the first position.

11. The apparatus of claim 9, wherein the beam-steering device comprises a pixelated liquid-crystal-on-silicon microdisplay.

12. The apparatus of claim 9, wherein the beam-steering device comprises a two-dimensional pixelated array of movable mirrors.

13. The apparatus of claim 9, further comprising:
  a first optics set configured to image a mirror plane of the MEMS mirror array onto the spectrally dispersive element; and
  a second optics set configured to convert angular dispersion of the plurality of carrier wavelengths generated by the spectrally dispersive element into a spatial separation of the plurality of carrier wavelengths at the beam-steering device.

14. The apparatus of claim 13, wherein at least one of the first and second optics sets includes at least one cylindrical lens.

15. The apparatus of claim 1, wherein the array of optical ports is a linear array.

16. The apparatus of claim 1, further comprising a configuration controller configured to change tilt angles of the mirrors MEMS mirror array to convert one of the first and second configurations into the other of the first and second configurations.

17. The apparatus of claim 1, wherein, in the second configuration:
  one of the first common port and the second common port is configured to operate as an input port; and
  the other one of the first common port and the second common port is configured to operate as an output port.

18. A method of configuring a wavelength-selective cross-connect (WSXC) device, the method comprising:
  sorting P optical ports of the WSXC device into n non-overlapping sets of ports, where P is a positive integer greater than five and n is a positive integer greater than one;
  in each of said n non-overlapping sets of ports, designating one common port and a respective plurality of plural ports;
  individually tilting tiltable mirrors in a MEMS mirror array of the WSXC device to cause a spectrally dispersive element of the WSXC device to disperse light across a beam-steering device of the WSXC device at n different positions that are offset from one another in a direction orthogonal to a dispersion direction such that each position is configured to receive light from a respective one of the n non-overlapping sets of ports; and
  reconfiguring the WSXC device to change the number n.

19. The method of claim 18, further comprising:
  configuring the WSXC device to operate as a bank of n wavelength-selective switches, each being configured to route light between the optical ports of a respective one of the n non-overlapping sets of ports.

20. An apparatus, comprising:
  an optical routing device that comprises an array of MEMS mirrors and a wavelength-selective optical router being optically connected to an array of P optical ports by the array of MEMS mirrors; and
  wherein the MEMS mirrors are configurable to connect the optical ports of the array of the P optical ports to the wavelength-selective optical router in different first and second configurations, the optical routing device being configured to operate some of the optical ports of the array of the P optical ports as a 1×$N_1$ first optical wavelength-selective switch in the first configuration with $N_1$ being smaller than P and greater than one, and being configured to operate some of the optical ports of the array of the P optical ports as a 1×$N_2$ second optical wavelength-selective switch and a 1×$N_3$ third optical wavelength-selective switch in the second configuration with the integers $N_2$ and $N_3$ each being greater than one and where $N_2+N_3+2 \leq P$.

21. The apparatus of claim 20, wherein the integers $N_2$ and $N_3$ are each greater than or equal to $(P-2)/4$.

22. The apparatus of claim 20, further comprising an electronic controller connected to operate the array of MEMS mirrors, the electronic controller being capable of operating the MEMS mirrors such that the optical ports of the array of the P optical ports and the wavelength-selective optical router are capable of being connected in any of the first and second configurations.

23. The apparatus of claim 20, further comprising a reconfigurable optical add-drop multiplexer, the reconfigurable optical add-drop multiplexer including the optical routing device.

24. The apparatus of claim 20, wherein the MEMS mirrors are configured to perform tilt motions.

25. The apparatus of claim 20, wherein the wavelength-selective optical router includes a second array of MEMS mirrors or an array of liquid-crystal-on-semiconductor elements.

* * * * *